(12) United States Patent
Thorpe

(10) Patent No.: US 8,283,799 B1
(45) Date of Patent: Oct. 9, 2012

(54) VENT TURBINE GENERATOR

(76) Inventor: Edward L. Thorpe, Mesa, AZ (US)

( * ) Notice: Subject to any disclaimer, the term of this patent is extended or adjusted under 35 U.S.C. 154(b) by 0 days.

(21) Appl. No.: 13/214,160

(22) Filed: Aug. 20, 2011

Related U.S. Application Data

(60) Provisional application No. 61/375,268, filed on Aug. 20, 2010.

(51) Int. Cl.
*F03D 9/00* (2006.01)
*H02P 9/04* (2006.01)

(52) U.S. Cl. .......................................................... 290/55
(58) Field of Classification Search ................... 290/55, 290/44, 43, 52
See application file for complete search history.

(56) References Cited

U.S. PATENT DOCUMENTS

| | | |
|---|---|---|
| 6,798,082 B1 | 9/2004 | Chen |
| 7,839,010 B2 * | 11/2010 | Harvey ............................ 290/55 |
| 2003/0190883 A1 | 10/2003 | Shockey |
| 2008/0191489 A1 | 8/2008 | Harvey |
| 2012/0038162 A1* | 2/2012 | Smith et al. ..................... 290/52 |

OTHER PUBLICATIONS eBay Information Page for 250W Small Grid Tie Power Inverter For Solar Panel and Wind Turbine System, visited Apr. 1, 2010.

* cited by examiner

*Primary Examiner* — Javaid Nasri
(74) *Attorney, Agent, or Firm* — Adam R. Stephenson, Ltd.

(57) ABSTRACT

A vent turbine generator. A generator mount is configured to couple to a top portion of a turbine base in turn configured to couple to a vent turbine. A threaded rod is configured to couple the vent turbine to a generator coupled to the generator mount. The rotational ratio of vent turbine to generator is one to one. A multi-device mount couples to the generator mount, partially encloses the generator, and receives a rectifier and inverter. A rectifier housing coupled to the multi-device mount houses the rectifier and has openings for access to the rectifier. An AC power plug couples the inverter to an electrical outlet. The generator, rectifier, inverter and AC power plug are electrically connected. When the vent turbine is rotated the vent turbine generator converts the rotational energy into electricity which is supplied to the building's power grid through the AC power plug plugged into the outlet.

19 Claims, 3 Drawing Sheets

VENT TURBINE GENERATOR

CROSS REFERENCE TO RELATED APPLICATIONS

This document claims the benefit of the filing date of U.S. Provisional Patent Application 61/375,268, entitled "Wind Powered Electricity Generating System" which was filed on Aug. 20, 2010, the disclosure of which is hereby incorporated entirely herein by reference.

BACKGROUND

1. Technical Field

Aspects of this document relate generally to air driven electrical generators. More specific implementations involve electrical generators configured to convert rotational energy from a vent turbine attached to a roof of a building into electricity.

2. Background Art

Electrical generators convert mechanical energy into electricity. Some electrical generators are powered by the movement of air, such as wind. Such devices generally have a turbine or other rotating portion that rotates in response to air movement, and this rotation provided work which can then be converted into electricity.

SUMMARY

Implementations of vent turbine generators may include: a threaded rod configured to couple to a vent turbine; the threaded rod coupled to a generator through a generator mount; the generator mount configured to couple to a top portion of a turbine base, where the turbine base is also configured to couple to the vent turbine and to a roof; a multi-device mount coupled to the generator mount; and a rectifier, an inverter and an alternating current (AC) power plug each coupled to the multi-device mount, all electrically coupled together, and electrically coupled with the generator.

Implementations of vent turbine generators may include one, all, or any of the following:

The generator mount may further include a hollow cylinder through which the threaded rod passes to couple to the generator.

The generator mount may further include a flat disc having an opening therein through which the generator extends to couple with the threaded rod.

The multi-device mount may have a reentrant opening through which the generator extends to couple with the threaded rod.

A rectifier housing may be coupled to the multi-device mount, the rectifier housing having a plurality of housing openings therethrough configured to allow access to the rectifier.

The rectifier may be coupled to a first side of a lower section of the multi-device mount and the inverter may be coupled to a second side of the lower section of the multi-device mount.

A rotational ratio of the vent turbine to the generator may be one to one.

Implementations of vent turbine generators may include: a generator configured to couple to a turbine base with a generator mount; the generator mount having a flat disc having an opening therethrough, a plurality of L-shaped bottom mounts coupled to the flat disc, a plurality of L-shaped side mounts coupled to the L-shaped bottom mounts, and a hollow cylinder coupled to the L-shaped side mounts; wherein the L-shaped side mounts are configured to couple to a top portion of the turbine base, and wherein the turbine base is configured to couple to a vent turbine; a multi-device mount coupled to the generator mount; and a rectifier, an inverter and an alternating current (AC) power plug coupled to the multi-device mount, electrically coupled together, and electrically coupled with the generator.

Implementations of vent turbine generators may include one, all, or any of the following:

A threaded rod may pass through the hollow cylinder and may be configured to couple the vent turbine to the generator.

The generator may extend through the opening in the flat disc to couple to a threaded rod configured to couple to the vent turbine.

The multi-device mount may have a reentrant opening through which the generator extends to couple to a threaded rod configured to couple to the vent turbine.

A rectifier housing may be coupled to the multi-device mount, the rectifier housing having a plurality of housing openings therethrough configured to allow access to the rectifier.

The rectifier may be coupled to a first side of a lower section of the multi-device mount and the inverter may be coupled to a second side of the lower section of the multi-device mount.

A rotational ratio of the vent turbine to the generator may be one to one.

Implementations of vent turbine generators may include: a generator coupled to a generator mount, the generator mount configured to couple to a top portion of a turbine base and the turbine base configured to couple to a vent turbine; and a multi-device mount coupled to the generator mount; the multi-device mount including a top section having a reentrant opening therein through which the generator passes, a substantially vertical upper section coupled to the top section, an angled middle section coupled to the substantially vertical upper section, and a substantially vertical lower section having a first side and a second side; wherein the top section, substantially vertical upper section and angled middle section partially enclose the generator; a rectifier coupled to the first side; and an inverter coupled to the second side.

Implementations of vent turbine generators may include one, all, or any of the following:

The generator mount may further include a hollow cylinder through which a threaded rod passes which is configured to couple the generator to the vent turbine.

The generator mount may include a flat disc having an opening therein through which the generator extends to couple to a threaded rod configured to couple to the vent turbine.

The generator may extend through the reentrant opening to couple to a threaded rod configured to couple with the vent turbine.

A rectifier housing may be coupled to the multi-device mount, the rectifier housing having a plurality of housing openings therein configured to allow access to the rectifier.

A rotational ratio of the vent turbine to the generator may be one to one.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended vent turbine generators and/or assembly procedures for vent turbine generators will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such vent turbine generators and implementing components, consistent with the intended operation.

Figure 1:
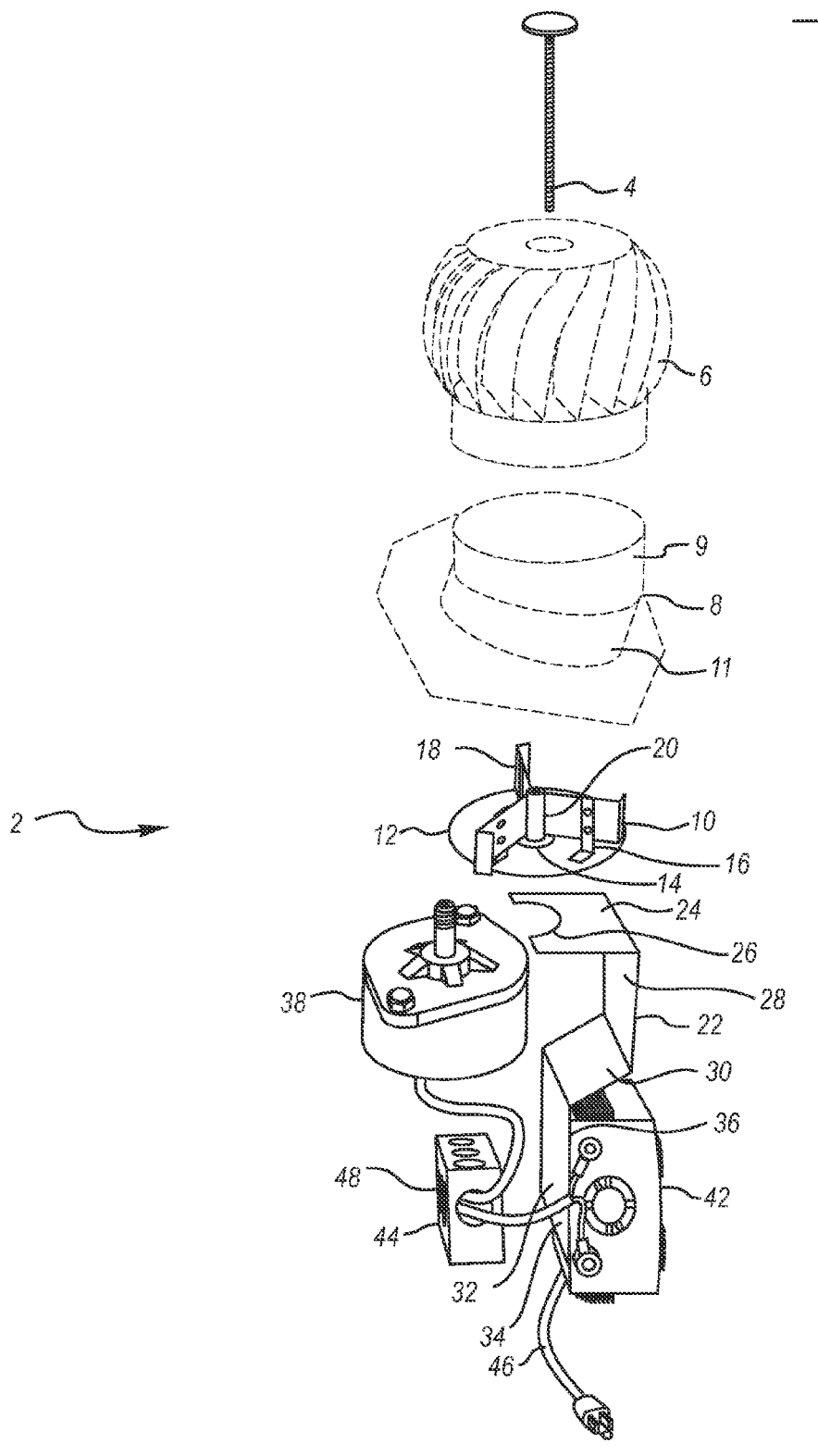
FIG. 1 is a perspective exploded view of an implementation of a vent turbine generator.

Referring now to FIG. 1, in implementations a vent turbine generator 2 includes a threaded rod 4 which is configured to pass through the top of a vent turbine 6. Vent turbines 6 are used to vent hot air from buildings, such as to vent the hot air from an attic of a home to the outside air. Variations of vent turbines 6 have a shape and structure similar or identical to that shown in FIG. 1 and are sold for instance under the marks/brands WHIRLYBIRD® and LOMANCO® manufactured by Lomanco, Inc., of Jacksonville, Ark. The vent turbines 6 are generally attached to the roof of a structure through the use of a turbine base 8, which is also shown in FIG. 1. Some turbine bases 8 have a mechanism by which an angle of a top portion 9 of the turbine base 8 may be altered with respect to the bottom portion 11 of the turbine base 8. This is useful, for instance, to adjust a turbine base 8 that is attached to a slanted roof in order that the vent turbine 6, which is configured to couple to the top portion 9 of the turbine base 8, may be upright and level.

Some vent turbines 6 are internally braced so as to maintain their rigidity and structure, while other vent turbines 6 are externally braced. The vent turbine 6 of FIG. 1 is internally braced. The internal bracing of the vent turbine 6 of FIG. 1 includes a hollow shaft at its center with arms reaching horizontally outward from the hollow shaft to the circumference of the vent turbine 6. A hole may be drilled into the top of the vent turbine 6 in order to allow the threaded rod 4 to gain access to the inside of the vent turbine 6, and thereafter the threaded rod 4 may be passed through the hollow shaft and the top or head of the threaded rod 4 may be secured to the top of the vent turbine 6 through various means, such as, by non-limiting example, through welding, riveting, bolting, screwing, gluing, a friction fit, and so forth. In implementations the threaded rod 4 may also be secured to the hollow shaft though in other implementations the threaded rod 4 need not be secured to the hollow shaft. In implementations wherein the vent turbine 6 is externally braced there will likely be no hollow shaft inside the vent turbine 6 through which the threaded rod 4 may pass. Although the hollow shaft in internally braced versions may serve to stabilize the threaded rod 4 and/or to limit its lateral movement, in externally braced versions the threaded rod 4 may simply be secured to the top of the vent turbine 6 such as by the techniques mentioned above or by any other techniques. In implementations the threaded rod 4 may be a long bolt with threads extending along the majority or the entirety of its longest length.

Referring still to FIG. 1, a generator mount 10 is configured to couple to the top portion 9 of the turbine base 8. In the implementation shown the generator mount 10 includes a flat disc 12 having an opening 14 therein. A plurality of bottom mounts 16 are coupled to the top face of the flat disc 12 and a plurality of side mounts 18 are coupled to the bottom mounts 16. The side mounts 18 are further coupled to one another through a hollow cylinder 20 at their center. The side mounts 18 are configured to couple to an inner surface of the top portion 9 of the turbine base 8 and the flat disc 12 couples to a generator 38. In this way the generator 38 is coupled to the turbine base 8 through the generator mount 10. In implementations the flat disc 12 is coupled to the generator 38 by two bolts which extend through corresponding openings in the flat disc 12 to screw into bolt holes that are integral to the generator 38. In other implementations the generator mount 10 could couple to the generator 38 in other ways, such as by a member which fits tightly around a portion of the generator 38. In particular implementations the generator 38 is an alternator. The generator 38 converts mechanical energy to electrical energy.

In the implementation shown in FIG. 1 the flat disc 12 has a circular shape and the opening 14 has a circular shape that is concentric with the flat disc 12. In other implementations the flat disc 12 and opening 14 could have other shapes and configurations. In the implementation illustrated there are three bottom mounts 16 and each has an L-shape, and there are further three side mounts 18 and they also each have an L-shape. In other implementations the side mounts 18 and bottom mounts 16 could have various other shapes and be present in other numbers and/or various of the components could be integral to one another.

Still referring to FIG. 1 and as described above, the generator 38 mounts to the generator mount 10. The threaded rod 4, described earlier, passes through the hollow cylinder 20 to couple to the generator 38, while the generator 38 extends through the opening 14 to couple to the threaded rod 4. In implementations a multi-device mount 22 is further coupled to the generator mount 10. In the implementation shown in FIG. 1 the multi-device mount 22 actually couples directly to both the generator mount 10 and the generator 38, and is indeed sandwiched therebetween and held in place by virtue of the bolts that are described above in reference to coupling the generator mount 10 to the generator 38 also passing through corresponding openings in the multi-device mount 22. In other implementations the multi-device mount 22 may be directly coupled only to the generator mount 10 or only to the generator 38 as desired using similar coupling mechanisms as described above including, without limitation, welding, riveting, bolting, screwing, gluing, a friction fit, and so forth.

The multi-device mount 22 has a top section 24 which has a reentrant opening 26 in it to allow the generator 38 to extend therethrough. Thus the generator 38 extends through the reentrant opening 26 and the opening 14 to couple to the threaded rod 4. The top section 24 in the implementation shown is substantially horizontal. Coupled to the top section 24 is an upper section 28 that is substantially vertical, i.e., it makes an about ninety-degree angle with the top section 24. Coupled to the upper section 28 is an angled middle section 30. The middle section 30 in the implementation shown is closer to being horizontal than vertical but is set at an angle to the horizontal plane. In other implementations the middle section 30 could be substantially horizontal and therefore substantially parallel with the top section 24 and have an angle of about ninety degrees with the upper section 28. In the implementation shown the top section 24, upper section 28 and middle section 30 at least partially enclose the generator 38. This is also seen in FIG. 2 and FIG. 3.

Figure 2:
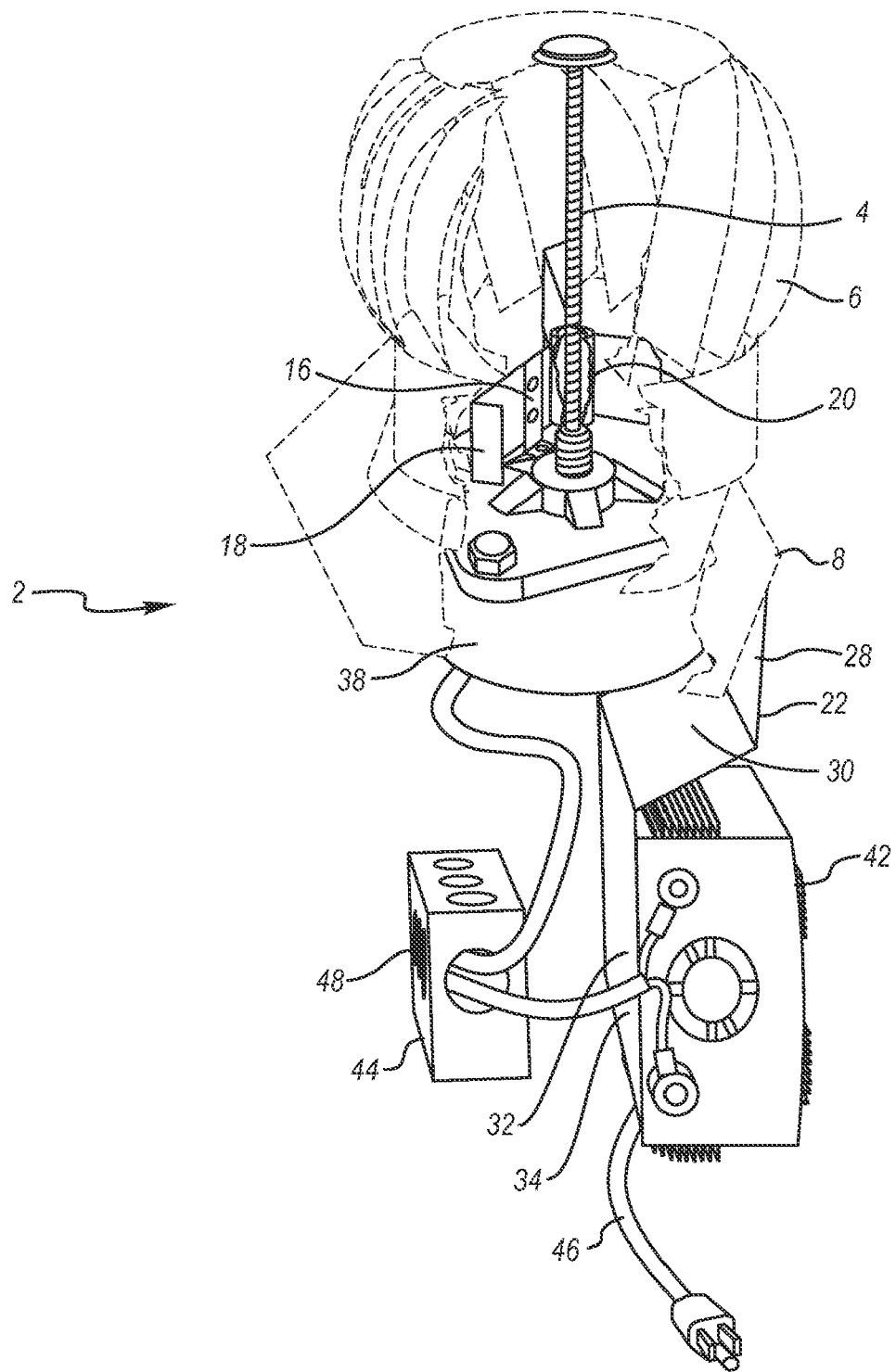
FIG. 2 is a perspective see-through view of an implementation of a vent turbine generator.

Referring to FIG. 1 and FIG. 2, in operation when the vent turbine 6 rotates, either due to rising heated air exiting an attic or other structure within a building, or by wind blowing outside the building, the rotation of the vent turbine 6 causes the threaded rod 4 to rotate due to the threaded rod 4 being coupled to the vent turbine 6. The threaded rod 4 in turn causes rotation of the rotating core of the generator 38, and the generator 38 converts the mechanical energy of the rotating vent turbine 6 into electrical energy.

Figure 3:
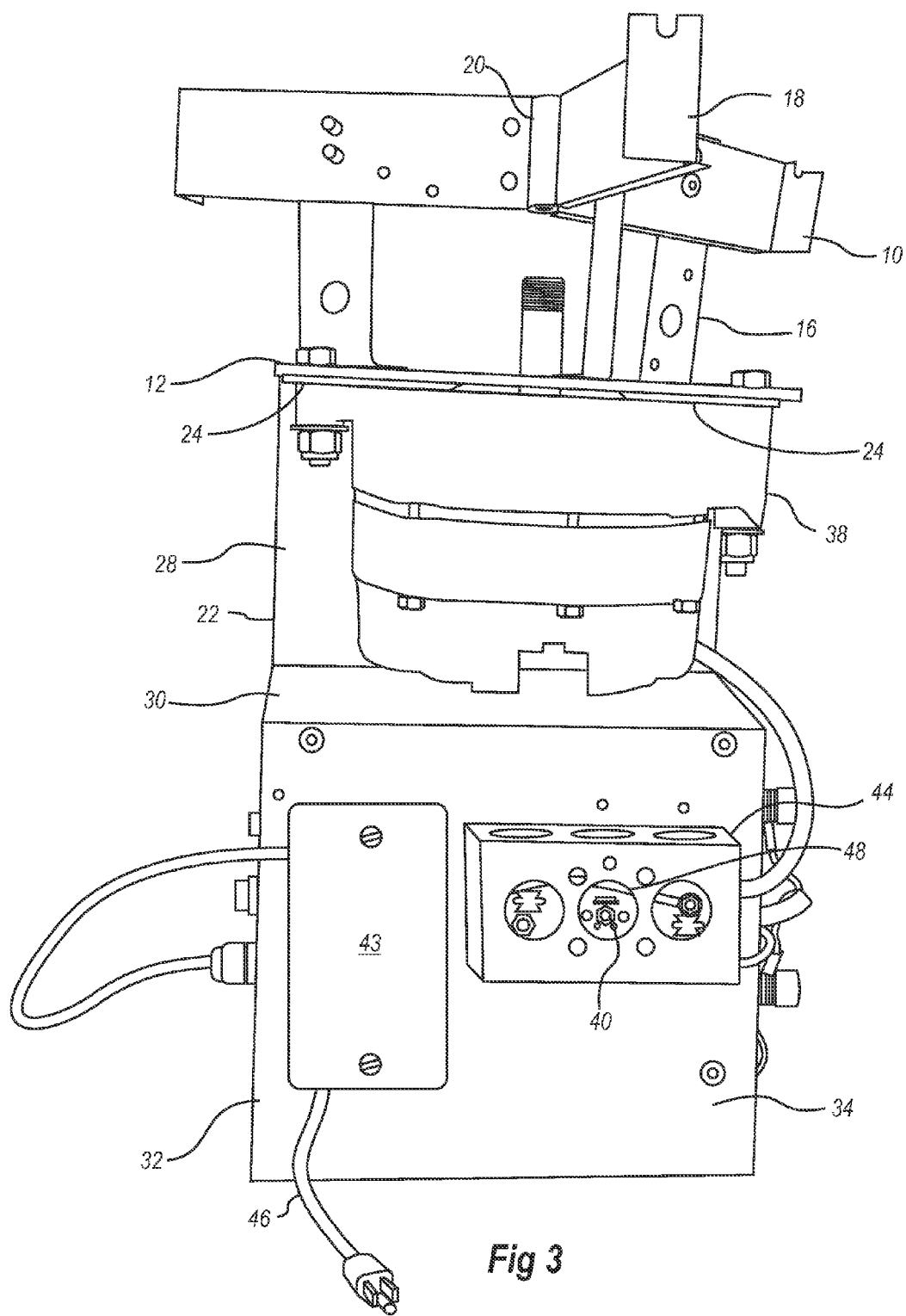
FIG. 3 is a perspective view of a generator mount and a multi-device mount of an implementation of a vent turbine generator, with related devices attached thereto.

Referring to FIG. 1 and FIG. 3, in implementations the multi-device mount 22 includes a lower section 32 coupled to the middle section 30. The lower section 32 of the implementation of FIG. 1 is substantially vertical, i.e., substantially parallel with the upper section 28 and has a first side 34 and a second side 36. A rectifier 40 is coupled to the first side 34 and an inverter 42 is coupled to the second side 36. In implementations the first side 34 is on the opposite side of the lower section 32 from the second side 36. In implementations the first side 34 has a first face and the second side 36 has a second face and the first face and second face is on the opposite side of the lower section 32 from the second face. In implementations a rectifier housing 44 couples to the first side 34 and houses the rectifier 40 and has housing openings 48 therein which are configured to allow access to the rectifier 40. An alternating current (AC) power plug 46 is further coupled to the multi-device mount 22.

The generator 38, rectifier 40, inverter 42, and AC power plug 46 are electrically connected to one another. For instance, by non-limiting example, in implementations the rotational energy of the vent turbine 6 is converted to electrical energy in the form of alternating current (AC) by the generator 38 and then the alternating current travels through wiring to the rectifier 40 and is there converted into direct current by the rectifier 40, then the direct current travels through wiring to the inverter 42 and the inverter 42 converts the direct current back to alternating current (AC) at the proper voltage and frequency to be routed into the building's electrical grid. The alternating current then travels by wiring from the inverter 42 to the AC power plug 46 which is plugged into an electrical outlet of the building, and thus the alternating current travels from the AC power plug 46 to the power grid of the building to supply electricity to the building.

In the implementations shown there is a one-to-one rotation ratio between the vent turbine 6 and the generator 38, though in other implementations gears may be used to obtain a gear ratio that is not one-to-one, such as in an implementation where a gear reduction or gear increase between the vent turbine 6 and the generator 38 is desirable.

In implementations other electrical devices or housing elements may be coupled to the multi-device mount 22. In implementations a housing element 43 may be coupled to the multi-device mount 22 to house the connection area where wiring exiting the inverter 42 is electrically coupled to the AC power plug 46.

In implementations the generator 38 is a Hurricane Wind Systems M4-Mark 1 permanent magnet alternator. In other implementations the generator 38 is an M6 Presto Wind alternator. In implementations the inverter 42 is a 250W inverter model number KKPG-250 and in other implementations the inverter 42 is a 300W POWER JACK grid tie power inverter. Implementations of inverters used may include various safety features, including islanding control. In implementations the flat disc 12 and/or the multi-device mount 22 may be made from sheet metal between about 0.060 and about 0.120 inches thick. In implementations the flat disc 12 and/or the multi-device mount 22 may be made from about 0.050 inch thick aluminum and either or both are cut from an about 8 inch by about 14 inch section. In implementations the wiring between the various electrical components may be 10 gauge three-wire power cord and may have quick disconnect connectors at junctures between one or more of the various electrical components. In implementations a coupler may be utilized to couple the threaded rod 4 to the generator 38 though in other implementations, and in the implementations shown in the drawings, no coupler is required. In implementations the AC power plug 46 is a three prong plug adapted to fit into a regular 110 V outlet, allowing electricity generated to be injected directly into the circuitry connected to the 110 V outlet.

In places where the description above refers to particular implementations of vent turbine generators, it should be readily apparent that a number of modifications may be made without departing from the spirit thereof and that these implementations may be applied to other vent turbine generators.

The invention claimed is:

1. A vent turbine generator, comprising:
   a threaded rod configured to couple to a vent turbine; the threaded rod coupled to a generator through a generator mount; the generator mount configured to couple to a top portion of a turbine base, where the turbine base is also configured to couple to the vent turbine and to a roof;
   a multi-device mount coupled to the generator mount;
   a rectifier, an inverter and an alternating current (AC) power plug each coupled to the multi-device mount, all electrically coupled together, and electrically coupled with the generator; and
   a rectifier housing coupled to the multi-device mount, the rectifier housing having a plurality of housing openings therethrough configured to allow access to the rectifier.

2. The generator of claim 1, wherein the generator mount further comprises a hollow cylinder through which the threaded rod passes to couple to the generator.

3. The generator of claim 1, wherein the generator mount further comprises a flat disc having an opening therein through which the generator extends to couple with the threaded rod.

4. The generator of claim 1, wherein the multi-device mount comprises a reentrant opening through which the generator extends to couple with the threaded rod.

5. The generator of claim 1, wherein the rectifier is coupled to a first side of a lower section of the multi-device mount and the inverter is coupled to a second side of the lower section of the multi-device mount.

6. The generator of claim 1, wherein a rotational ratio of the vent turbine to the generator is one to one.

7. A vent turbine generator, comprising:
   a generator configured to couple to a turbine base with a generator mount; the generator mount comprising a flat disc having an opening therethrough, a plurality of L-shaped bottom mounts coupled to the flat disc, a plurality of L-shaped side mounts coupled to the L-shaped bottom mounts, and a hollow cylinder coupled to the L-shaped side mounts;
   wherein the L-shaped side mounts are configured to couple to a top portion of the turbine base, and wherein the turbine base is configured to couple to a vent turbine;
   a multi-device mount coupled to the generator mount; and
   a rectifier, an inverter and an alternating current (AC) power plug coupled to the multi-device mount, electrically coupled together, and electrically coupled with the generator.

8. The generator of claim 7, wherein a threaded rod passes through the hollow cylinder and is configured to couple the vent turbine to the generator.

9. The generator of claim 7, wherein the generator extends through the opening in the flat disc to couple to a threaded rod configured to couple to the vent turbine.

10. The generator of claim 7, wherein the multi-device mount has a reentrant opening through which the generator extends to couple to a threaded rod configured to couple to the vent turbine.

11. The generator of claim 7, further comprising a rectifier housing coupled to the multi-device mount, the rectifier housing having a plurality of housing openings therethrough configured to allow access to the rectifier.

12. The generator of claim 7, wherein the rectifier is coupled to a first side of a lower section of the multi-device mount and the inverter is coupled to a second side of the lower section of the multi-device mount.

13. The generator of claim 7, wherein a rotational ratio of the vent turbine to the generator is one to one.

14. A vent turbine generator, comprising:
a generator coupled to a generator mount, the generator mount configured to couple to a top portion of a turbine base and the turbine base configured to couple to a vent turbine; and
a multi-device mount coupled to the generator mount; the multi-device mount comprising a top section having a reentrant opening therein through which the generator passes, a substantially vertical upper section coupled to the top section, an angled middle section coupled to the substantially vertical upper section, and a substantially vertical lower section having a first side and a second side;
wherein the top section, substantially vertical upper section and angled middle section partially enclose the generator;
a rectifier coupled to the first side; and
an inverter coupled to the second side.

15. The generator of claim 14, wherein the generator mount further comprises a hollow cylinder through which a threaded rod passes which is configured to couple the generator to the vent turbine.

16. The generator of claim 14, wherein the generator mount comprises a flat disc having an opening therein through which the generator extends to couple to a threaded rod configured to couple to the vent turbine.

17. The generator of claim 14, wherein the generator extends through the reentrant opening to couple to a threaded rod configured to couple with the vent turbine.

18. The generator of claim 14, further comprising a rectifier housing coupled to the multi-device mount, the rectifier housing having a plurality of housing openings therein configured to allow access to the rectifier.

19. The generator of claim 14, wherein a rotational ratio of the vent turbine to the generator is one to one.

* * * * *